(12) United States Patent
Kosuge et al.

(10) Patent No.: US 6,444,967 B1
(45) Date of Patent: Sep. 3, 2002

(54) MICROSCOPE IN-FOCUS STATE DETECTING METHOD AND APPARATUS USING IMAGE CONTRAST DETECTION

(75) Inventors: Shogo Kosuge, Tachikawa; Takahiro Shimizu, Higashimurayama, both of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,030

(22) Filed: Mar. 14, 2000

(30) Foreign Application Priority Data

Mar. 18, 1999 (JP) ............................................ 11-073378

(51) Int. Cl.$^7$ ............................................. H04N 5/232
(52) U.S. Cl. ..................... 250/201.3; 348/353
(58) Field of Search .......................... 250/201.2, 201.3, 250/201.7; 348/79, 80, 353, 351

(56) References Cited

U.S. PATENT DOCUMENTS 5,784,104 A * 7/1998 Arai ........................... 348/353

* cited by examiner

*Primary Examiner*—Stephone Allen
*Assistant Examiner*—Bradford Hill
(74) *Attorney, Agent, or Firm*—Antonelli, Terry, Stout & Kraus, LLP (57) ABSTRACT

A method and a device used in an optical microscope apparatus and for automatic focusing, and using an image contrast detection method which is not affected by noise. In order to remove a noise component, a contour component of an image picked up by the microscope is detected as a contour signal obtained by a difference between an original image and a delayed signal of the original image. A difference in level in maximum and minimum values of this contour signal is adopted as an image contrast signal. Such image contrast signals are produced at various microscope focusing direction positions. A position where a maximum image contrast signal is obtained is made to be an in-focus position.

21 Claims, 6 Drawing Sheets

MICROSCOPE IN-FOCUS STATE DETECTING METHOD AND APPARATUS USING IMAGE CONTRAST DETECTION

BACKGROUND OF THE INVENTION

The present invention relates to a method and an apparatus for performing automatic focus when a specimen is observed or image-processed by using an optical microscope, and particularly relates to a method and an apparatus for detecting image contrast of a specimen in order to attain automatic focus.

The present invention is applicable, for example, to a very small size measuring apparatus, a line width measuring apparatus, an external appearance examining apparatus, and so on. Examples of subjects to be measured or examined include a magnetic pole surface of a write/read magnetic head to be used in a hard disk unit, a circuit pattern on a semiconductor integrated circuit, etc.

Figure 7:
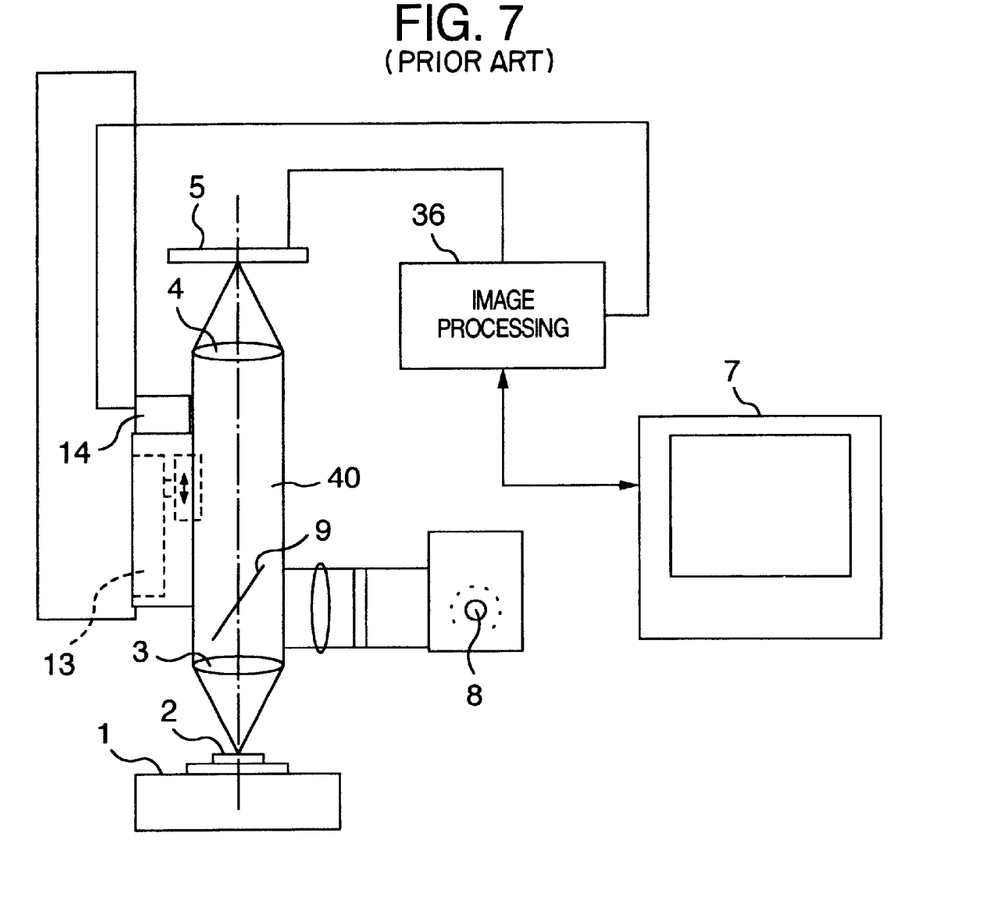
FIG. 7 is a view showing the configuration of a microscope apparatus as a background-art example.
Figure 8:
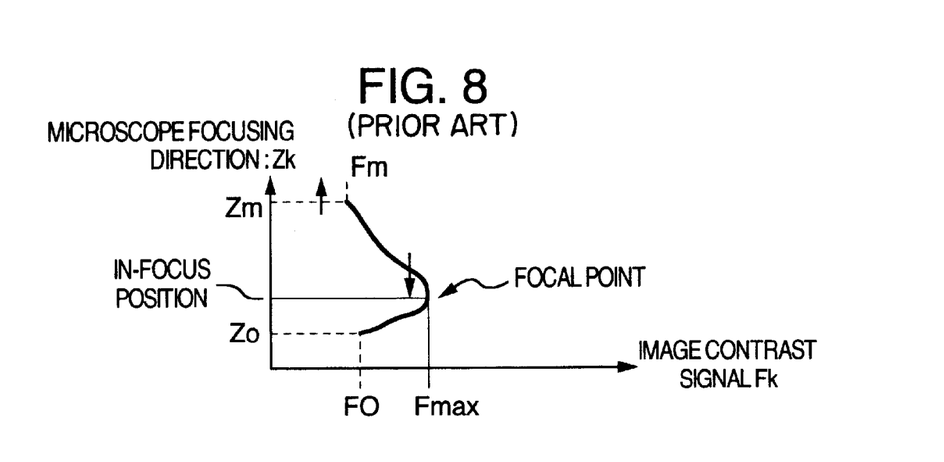
FIG. 8 is a diagram useful in explaining an in-focus position detection method.

Heretofore detection of image focus is attained by detecting a high-frequency component of a measurement portion on a subject to be examined. Specifically, an image from an optical microscope is picked up with a TV camera. Then, all the contour components of a target portion to be examined on the thus obtained image are extracted, and the total sum of the extracted contour components is adopted as a focus detection signal. In an optical microscope apparatus shown in FIG. 7, which is a typical prior out automatic focusing apparatus, reference numeral 1 represents an XY-direction movable specimen table; 2, a specimen; 3, an objective lens; 4, an imaging lens; 5, a photo-electric conversion sensor; 36, an image processor; 7, a video monitor; 8, an illuminator; 9, a beam splitter; 40, an optical microscope; 13, a driving motor; and 14, a microscope up/down moving mechanism (moving in Z-axis direction). In FIG. 7, while the specimen 2 mounted on the specimen table 1 is observed with the optical microscope 40, a video signal is output from the photoelectric conversion sensor 5 such as a TV camera or the like disposed on an imaging plane of the imaging lens 4. Contour components of the video signal are processed in the processor 36 so as to form a focus component signal. On the basis of the focus component signal, the microscope up/down moving mechanism 14 is moved up/down by the driving motor 13 so that focusing is carried based on that a position where an image contrast signal has a maximum is regarded as a focal point. An example of automatic focusing control will be described with reference to FIG. 8. FIG. 8 is a diagram for explaining the relation between a microscope focus position and an image contrast signal. First, the microscope up/down moving mechanism 14 is moved, while an image contrast signal Fk for each Zk between Zo to Zm in the microscope focusing direction is obtained. Of the obtained image contrast signals Fo to Fm, a maximum value Fmax is detected. The microscope up/down moving mechanism 14 is moved from Zm toward Zo at a constant speed while the image contrast signal Fk is obtained again and monitored as to whether it is equal to the maximum value Fmax or not. The microscope up/down moving mechanism 14 is stopped at a position where Fk is equal to Fmax. This stop position is an in-focus position.

Although a high-frequency component of a video signal is usually used as a contrast signal, the component includes a noise component. An accurate focal point cannot be obtained if the noise component exists. Generally, a noise clip is provided to remove a noise component. However, when the amplification factor is increased to obtain an image contrast signal F, the noise component is beyond a noise clip level, so that the noise component is undesirably contained in the image contrast signal F.

For such a reason, there is a possibility that the noise component contained as an image contrast component affects the detection of the intended image contrast. Thus, the prior art has such a disadvantage.

SUMMARY OF THE INVENTION

It is an object of the present invention to solve such a problem and provide an image contrast detection method having no influence of noise, and a focusing method which is suitable for a microscope.

Further, it is another object of the present invention to make it possible to detect image contrast stably when magnification is changed (that is, when an objective lens is changed) and when a component extraction range is changed.

In order to attain the foregoing objects, according to the present invention, only a contour component, as a subject to be detected, is produced on the basis of a difference between an original image (original video signal from a TV camera) and a delayed image (delayed signal of the original video signal) formed by delaying the original image by a predetermined delay time for the purpose of eliminating a noise component, and a difference between a maximum and a minimum levels of a contour component signal representing the contour component is adopted as image contrast.

One feature of the present invention is that the delay time is preset in accordance with the magnification depending on an objective lens in use of a microscope because it is necessary to make the delay time suitable in accordance with the magnification depending on the objective lens in use of the microscope when the contour component is detected.

DESCRIPTION OF THE EMBODIMENTS OF THE INVENTION

Preferred embodiments of the present invention will be described below with reference to the drawings. In the drawings, similar members are referenced correspondingly.

Figure 1:
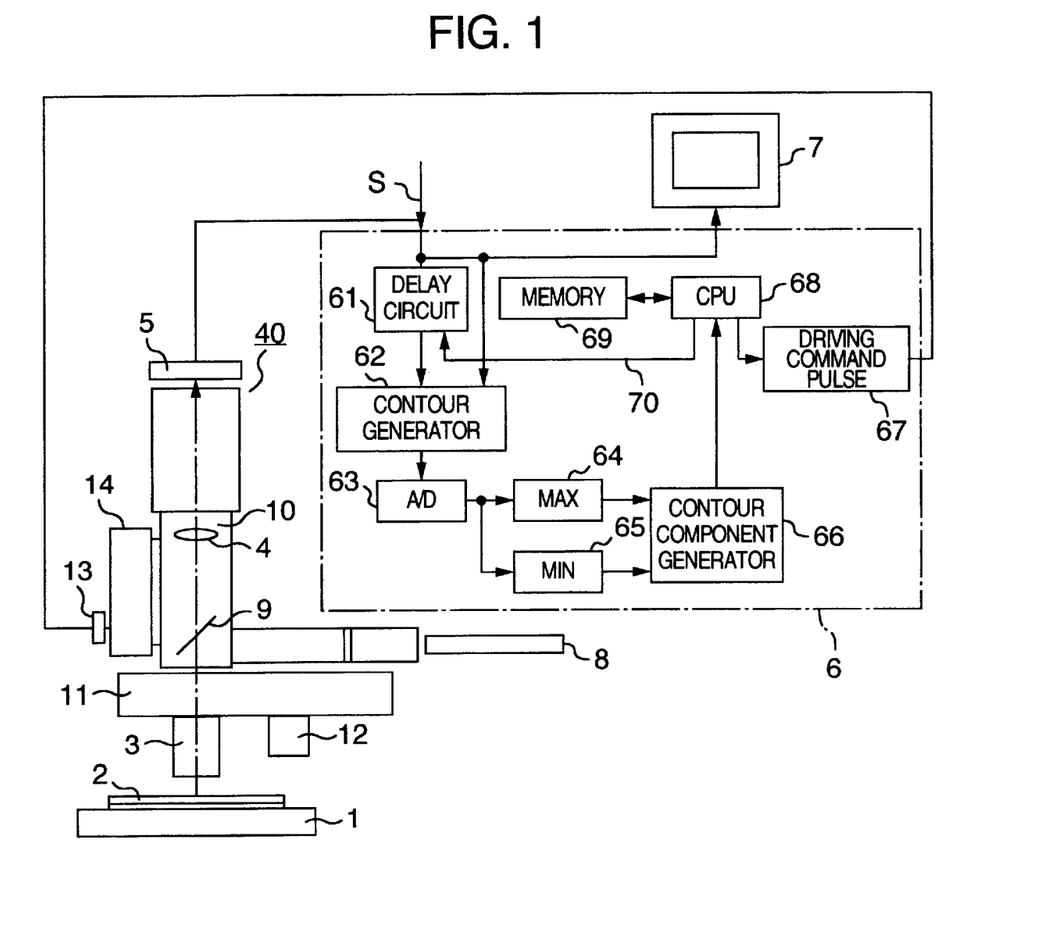
FIG. 1 is a block diagram showing the configuration of a microscope apparatus according to an embodiment of the present invention.

FIG. 1 is a block diagram showing the configuration of a microscope apparatus according to an embodiment of the present invention. In FIG. 1, reference numeral 1 represents an XY-direction movable specimen table; 2, a specimen; 3, an objective lens; 4, an imaging lens; 5, a photoelectric conversion sensor TV camera; 6, an image processor; 7, a video monitor; 8, a fiber illuminator; 9, a beam splitter; 10, an optical microscope; 11, a magnification varying mechanism; 12, a standby objective lens; 13, a driving motor or a piezoelectric element; 14, a microscope up/down moving mechanism (moving in Z-axis direction); 61, a delay circuit; 62, a contour A generator; 63, an A/D converter; 64, a maximum value comparator; 65, a minimum value comparator; 66, a contour-component C generator; 67, a driving command pulse oscillator for the driving motor or the piezoelectric element; 68, a central processing unit (hereinafter, CPU) for performing reading of image contrast, generation of the driving command pulse, control of access to a memory 60, other general control of the microscope apparatus, and so on; and 69, a memory for storing image contrast signals Fk and microscope focusing direction positions Zk from the contour-component C generator 66. Delay time preset in the delay circuit 61 is changed over or reset through a control line 70 from the CPU 68 so as to be suitable for an objective lens in use, for example, when the objective lens 3 is switched to the standby objective lens 12.

Figure 2:
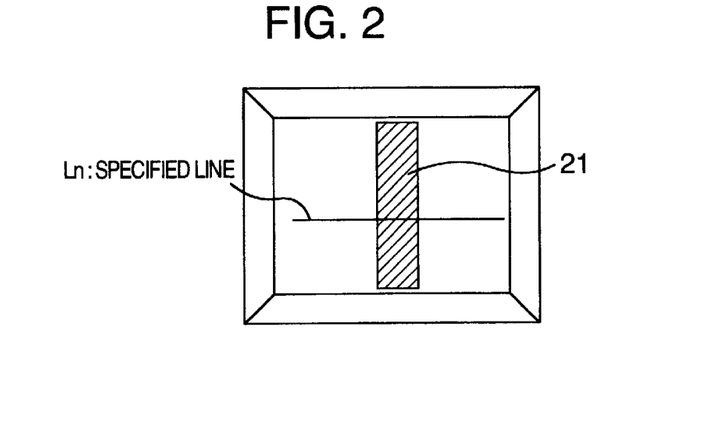
FIG. 2 is a video monitor screen useful in explaining the embodiment of FIG. 1.

A process of detecting a contour component will be described with reference to FIG. 2. For the detection of a contour component, as shown in FIG. 2, a video signal S (see FIG. 3) of the specimen 21 on a scanning line (specified line) specified on the screen and a delayed signal S1 formed by phase-delaying the signal S by time t are put into the contour A generator 62 operating as a differential circuit so as to obtain a contour A.

Here, the delay time Z is obtained by:

(delay time $t$):(horizontal scanning time $Ht$)=(optical resolution $\alpha$):(horizontal field of view $Hw$)

that is, $t=(Ht*\alpha)/Hw$

Since every object lens is different from one another in the horizontal field of view Hw, the delay time t of every object lens is also set up differently from one to another.

For example:

(1) In the case of a 100×magnification objective lens, a 3.3×magnification imaging lens, and a ⅔ inch type TV camera (pick up size: 8 mm×6 mm), the field of view is:

Horizontal $\frac{8 \text{ mm}}{100*3.3}$  Vertical $\frac{6 \text{ mm}}{100*3.3}$ That is, the field of view is 0.002424 mm horizontal and 0.001818 mm vertical.

Calculation is made in the horizontal direction:

From the horizontal field of view Hw=about 24 μm, the optical resolution α=0.3 μm, and the horizontal scanning time Ht=50 μs, $t=50*0.3/24=0.63 \ \mu s$ Thus, the delay time t becomes 0.63 μs.

(2) In the case of a 10×magnification objective lens:

From the horizontal field of view Hw=about 240 μm, the optical resolution α=0.5 μm, and the horizontal scanning time Ht=50 μs, $t=50*0.5/240=0.1 \ \mu s$ Thus, the delay time t becomes 0.1 μs.

Figure 3:
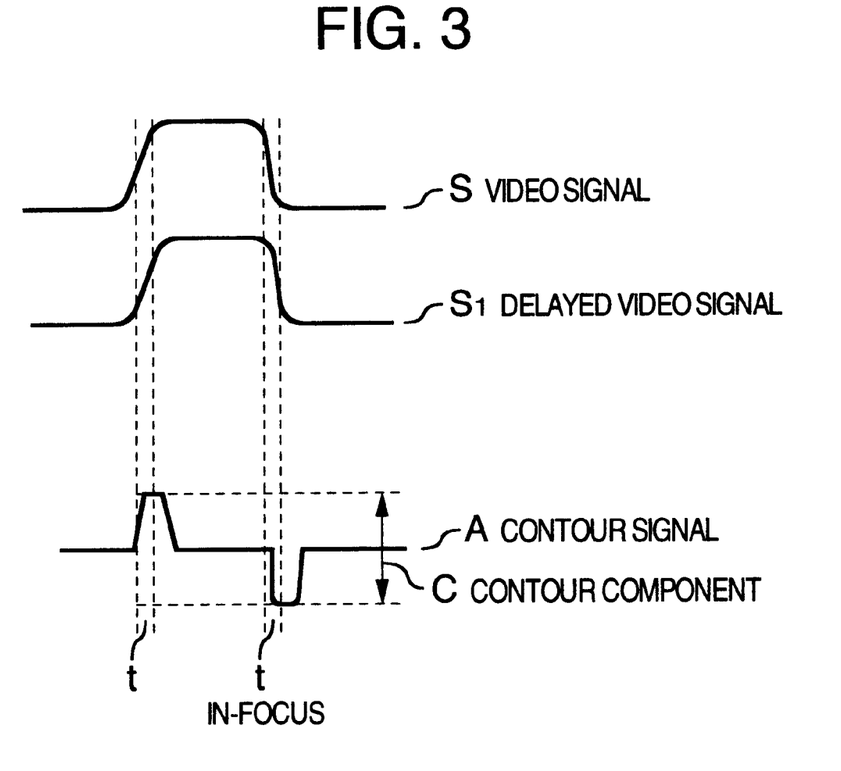
FIG. 3 is a waveform useful in explaining a contour component extraction method in the embodiment of FIG. 1.
Figure 4:
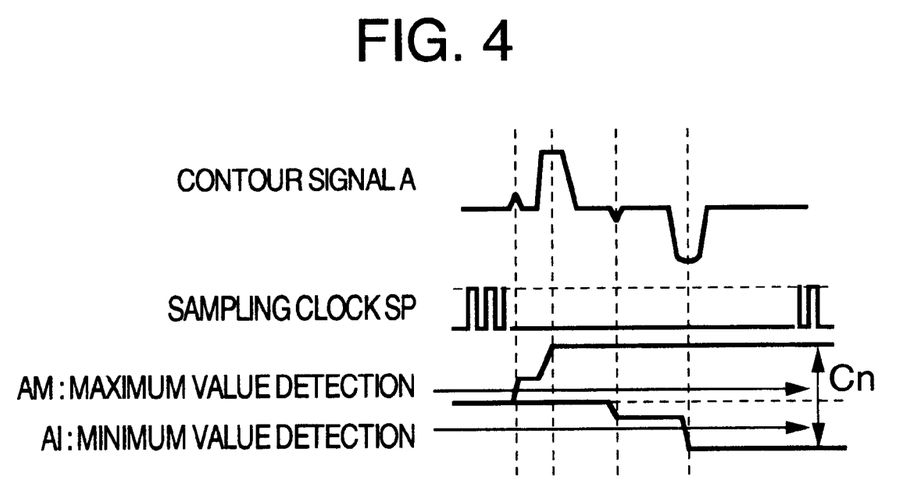
FIG. 4 is a waveform useful in explaining an image contrast detection method in the embodiment of FIG. 1.
Figure 5:
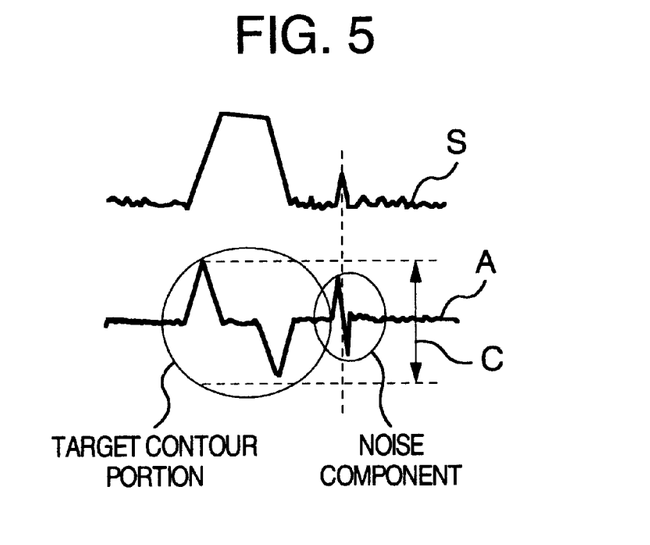
FIG. 5 is another waveform useful in explaining the contour component extraction method in the embodiment of FIG. 1.

As shown in FIG. 3, a difference between a maximum and a minimum levels of the contour signal A is made to be a contour component C. FIG. 5 shows the component as a real signal A containing a noise component. Further, FIG. 4 shows a video signal, a sampling clock SP, the contour signal A and the contour component C. The contour signal A is A/D-converted with a sufficiently fine sampling clock A, and maximum and minimum digital data are obtained by the maximum value comparator 64 and the minimum value comparator respectively. The difference between the maximum AM and the minimum AI is calculated at the timing when the contour signal A terminates. Thus, the contour component C is obtained. At this time, the microscope up/down moving mechanism 14 is temporary stopped at one of predetermined microscope stop positions. By obtaining the difference between the maximum and the minimum from the contour component, it is possible to remove noise except noise components superimposed on the maximum and minimum values. The cycle of the sampling clock SP may preferably be about one-thousandth of the horizontal scanning time Ht, that is, 50 ns, or shorter. In this way, the microscope up/down moving mechanism 14 is stepped while stopping at each of the predetermined microscope stop positions to detect the contour component at each stop position so as to detect a maximum contour component and the position where the maximum contour component is detected may be determined to be the in-focus position.

As shown in FIG. 4, in this embodiment, contour components Cn are further obtained at each microscope stop position in respective scanning lines within a predetermined component extraction range or area placed or arbitrary set on the specimen, and the sum of those contour components is used as image contrast F (not shown).

Figure 6:
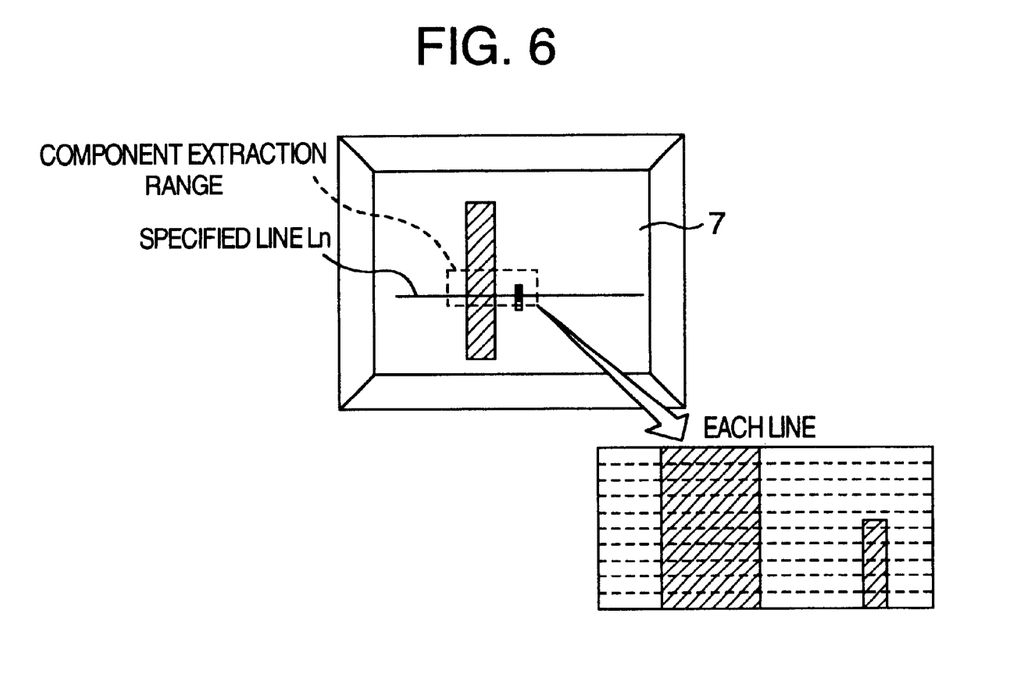
FIG. 6 is a video monitor screen useful in explaining a contrast signal generating method in the embodiment of FIG. 1.

Further in detail, as shown in FIG. 6, in order to relieve the noise components superimposed on the maximum and minimum values, contour components C1 to Cn are obtained in the respective lines within the above-mentioned predetermined component extraction range. These contour components are summed up to obtain the contrast signal F. That is:

$F=C1+C2+...+Cn$

By summing up the components in the respective lines, a random noise component can be reduced, and an image contrast component which is average within the component extraction range can be obtained.

On the basis of the contrast component F obtained thus, a driving pulse is generated from the driving control circuit 67 to drive the driving motor 13 so as to obtain a maximum contrast component F. An example of automatic focusing control is similar to that of FIG. 8. That is, first, the microscope up/down moving mechanism 14 is moved, and an image contrast signal Fk for each position Zk between Zo to Zm in the microscope focusing direction is obtained. Image contrast signals Fo to Fm obtained thus are stored in the memory 69 respectively. Of the stored image contrast signals Fo to Fm, a maximum value Fmax is obtained. Next, the microscope up/down moving mechanism 14 is moved from Zm toward Zo at a constant speed while a new image contrast signal Fk is obtained one after another and monitored as to whether it is equal to the maximum value Fmax or not. The microscope up/down moving mechanism 14 is stopped at a position where Fk is equal to Fmax. This stop position is an in-focus position. A magnified image of the specimen is obtained by using the microscope at the stop position, and displayed on the monitor 7.

Figure 9:
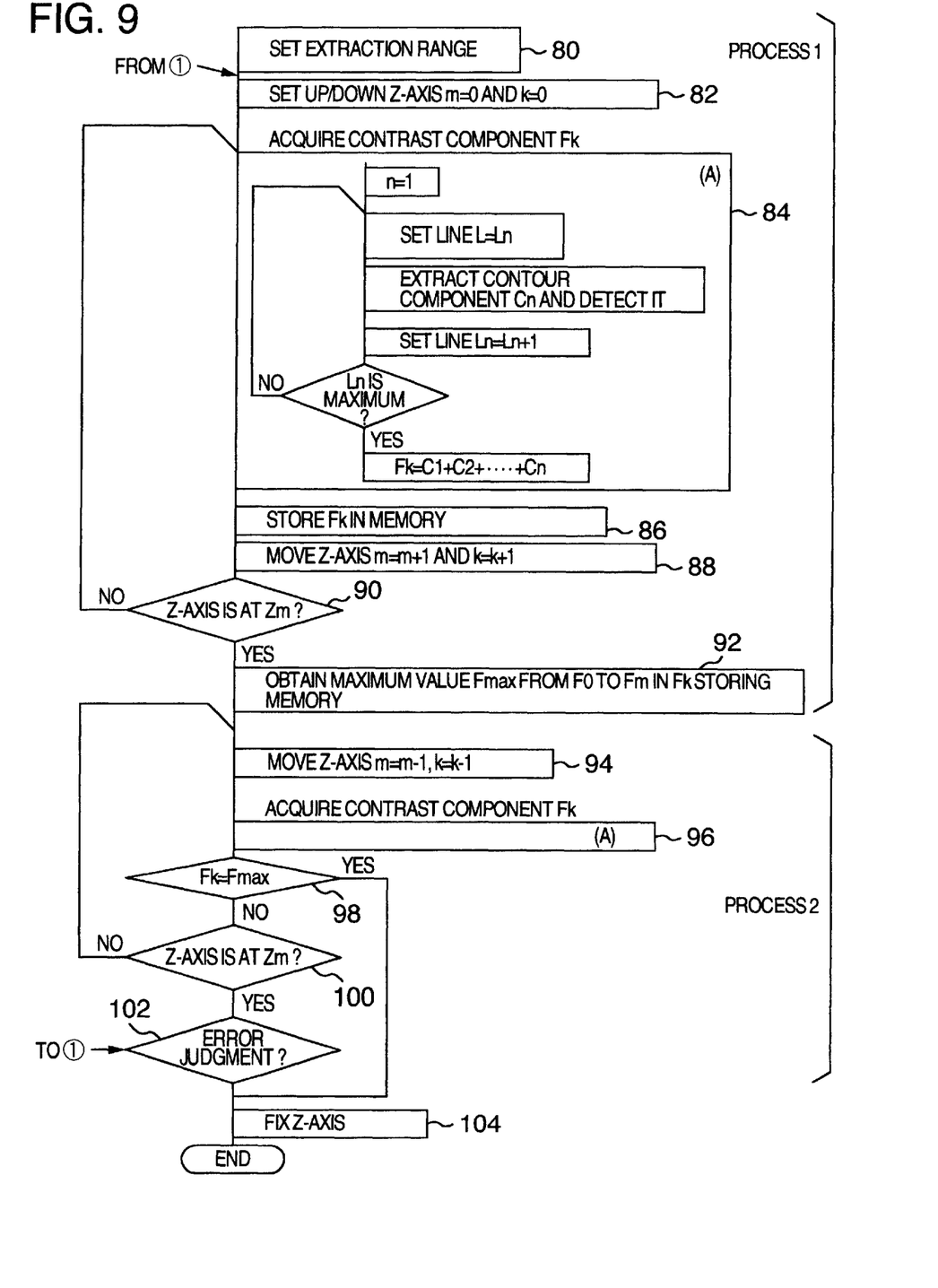
FIG. 9 is a flow chart of an automatic focal point detection method according to the embodiment of the present invention.

FIG. 9 is a flow chart showing the operation of the above-mentioned microscope focusing control according to the embodiment of the present invention.

In FIG. 9, first, a component extraction range is set (Step 80). Next, k is set to 0, and the position Zk of the microscope up/down moving mechanism (that is, microscope focusing direction axis) is set at its lower limit Zo in the microscope up/down moving range of from Zo to Zm (Step 82). Next, contrast Fk (k=0) is obtained over the component extraction range set in Step 80 (Step 84). Specifically, in Step 84, contour components C1 to Cn are extracted all over n scanning lines in the component extraction range set in Step 80, so as to obtain a contrast component Fo (=C1+C2+ . . . +Cn). Next, the thus obtained contrast component Fo is stored in the Fk storing memory (Step 6). Step 84 is repeated till the Z-axis moves to the pper limit Zm in the up/down moving range (Steps 88 and 90). If it is concluded that the Z-axis position is located at the upper limit Zm in Step 90 of judging the Z-axis position, a maximum value Fmax of the contrast components Fo to Fm is obtained from the Fk storing memory (Step 92).

The above process is an image focus detection processing portion of the image focusing control. This process is hereinafter referred to as Process 1. Process 2 following Process 1 is a processing portion in which control is performed for actually positioning the microscope in an in-focus position on the basis of the value Fmax detected in Process 1.

In Process 2, first, the Z-axis is moved to a position Zm−1, and k is set to k−1 (Step 94). Then, a contrast component Fk (k=k−1) is acquired in the position (Step 96). The processing in the Step 96 is similar to that in Step 84, and hence its description will be omitted. Next, the thus acquired value Fk is compared with the maximum value Fmax (Step 96). If it is proved that the values Fk and Fmax are equal to each other, the Z-axis is fixed at the position Zm−1 (Step 104), and the control for positioning the microscope in the in-focus position is completed. If it is proved that the values are not equal, it is judged whether the Z-axis is located at Zm or not (Step 100). If it is proved that the Z-axis is not located at Zm, the process returns to Step 94. Steps 94, 96, 98 and 100 re thus repeated till the relation Fk=Fmax is detected. When the relation Fk=Fmax is not detected even in the case where the Z-axis reaches the position Zm, it is concluded that a detection error has occurred (Step 102).

Figure 10:
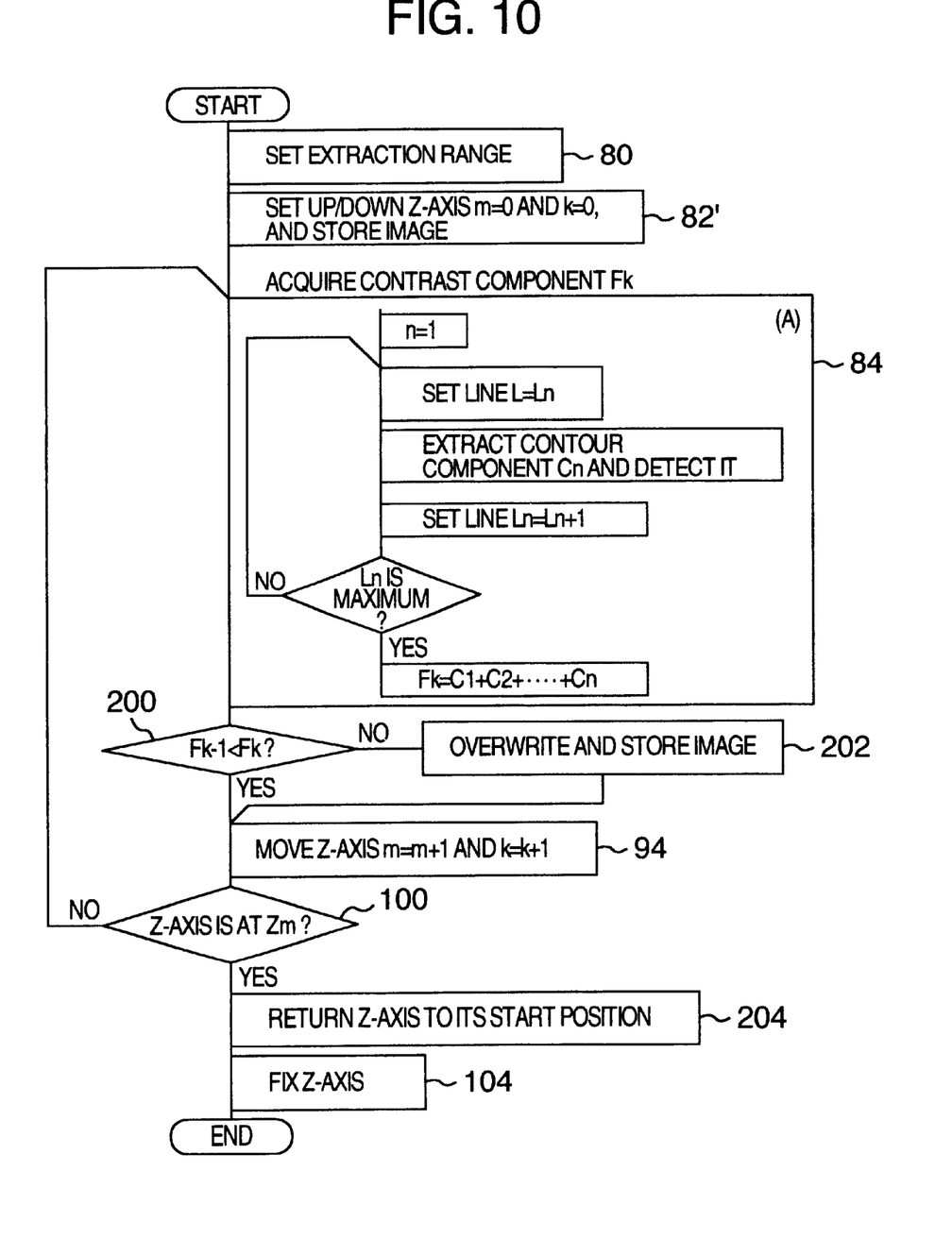
FIG. 10 is a flow chart of an automatic focal point detection method according to another embodiment of the present invention.

FIG. 10 is a flow chart showing the operation of microscope focusing control according to another embodiment of the present invention. The configuration of the microscope apparatus is similar to that of FIG. 1. In this embodiment, first, the microscope up/down moving mechanism 14 is moved, and an image contrast signal Fk is obtained at each position Zk between the positions Zo and Zm in the microscope focusing direction. In this course, however, if the image contrast signal Fk increases in comparison with a previously detected one Fk, a magnified image of the specimen at that time is overwritten and stored in the memory 69. Finally, an image when the contrast signal Fk has a maximum, that is, an image at an in-focus position is stored in the memory 69.

In FIG. 10, first, a component extraction range is set in Step 80 in the same manner as in the embodiment of FIG. 9. Next, k is set to 0, the position Zk of the microscope up/down moving mechanism (that is, microscope focusing direction axis) is positioned in the lower limit Zo in the microscope up/down moving range of from Zo to Zm, and an image picked up by the microscope in the position Zo is stored in the memory 69 (Step 82'). Next, in Step 84, contrast Fk (k=0) is obtained over the set component extraction range in the same manner as in FIG. 9. Next, the thus obtained contrast component is compared with a previously detected one (Step 200). If it is proved that the contrast component obtained this time is larger than the previous one, an image picked up this time is overwritten and stored in the memory 69 (Step 202). Otherwise, k is set to k+1, and the Z-axis is moved to the next position (Step 94). Then, Steps 84, 202 and 94 are repeated till it is concluded that the Z-axis reaches the position Zm (Step 100). If it is concluded in Step 100 that the Z-axis reaches the position Zm, the Z-axis is returned to its start position for the focal point detection process (Step 204).

Thus, in this embodiment, the microscope up/down moving mechanism is moved, and an image contrast signal Fk is obtained at each position Zk between the positions Zo and Zm in the microscope focusing direction. In this course, the image contrast signal Fk obtained currently is compared with a previously obtained one Fk. If it is proved that the image contrast signal Fk currently obtained increases, an image at present is overwritten and stored in the memory 69. As a result, finally, an image when the contrast signal Fk has a maximum, that is, an image at n in-focus position is stored in the memory 69. In his embodiment, there is an effect that it is possible to eliminate Process 2 in the embodiment of FIG. 9, and it is possible to provide more quickly an image for image processing such as external appearance examination, size measurement, or the like, in a post-stage processor.

According to the above-mentioned embodiments of the present invention, various advantages can be obtained. For example, there is an advantage as follows. Since a difference between a maximum and a minimum value of each contour signal is obtained, noise other than noise components superimposed on the maximum and minimum values can be removed, and only a target contour component with maximum contrast can be detected. Accordingly, image contrast superior in reproducibility can be detected, and as a result, reproducible automatic focusing can be achieved.

Further, there is an advantage that image contrast components in respective scanning lines within a component extraction range are summed up to obtain an average image contrast component in the component extraction range, so that reproducible automatic focusing can be achieved.

While the present invention has been particularly described and shown with reference to the embodiments thereof, it will be understood by those skilled in the art that various changes in the form and detail and omissions may be made therein without departing from the scope of the invention. For example, although the main parts of the image processor in FIG. 1 were shown as discrete circuit blocks, it will be understood that the blocks 61, 62, 64, 65, 66, and so on can be implemented by software.

What is claimed is:

1. In a microscope apparatus wherein an image of a specimen from an optical microscope is converted to a video signal by an opto-electric converting sensor so that an image of said specimen in an in-focus state is displayed on a monitor, a method of detecting said in-focus state comprising the steps of:

stepping said microscope along a focusing direction of said microscope to sequentially move said microscope;

obtaining a difference between an original video signal of said specimen taken by said sensor at a predetermined microscope stop position in said stepping step and a delayed signal of said original video signal to generate a first contour-component signal;

detecting a difference between maximum and minimum values of an amplitude of said first contour-component signal to obtain a first contrast signal; and adjusting a focus of said image based on said first contrast signal.

2. A method according to claim 1, further comprising the step of detecting a maximum contrast signal from said first contrast signal, so that the focus of said image is adjusted based on said maximum contrast signal.

3. A method according to claim 1, wherein a delay time of said delayed signal of said original video signal is preset in accordance with the magnification depending on an objective lens of said microscope.

4. A method according to claim 3, wherein said delay time is defined by:

$$t=(Ht*\alpha)/Hw$$

wherein t represents said delay time; Ht, horizontal scanning time of said opto-electric converting sensor; $\alpha$, optical resolution of said microscope; and Hw, a horizontal field of view of said microscope.

5. A method according to claim 1, wherein said step of obtaining a difference between said original and delayed signals is repeated a plurality of times for a predetermined contour component signal extraction area placed on said specimen at each of said predetermined microscope stop positions of said stepping step to generate a plurality of second contour component signals for each of said predetermined each microscope stop positions, and wherein said step of detecting a difference between maximum and minimum values includes the steps of detecting a difference between maximum and minimum values of each of said second contour-component signals to generate a plurality of second contrast signals and summing said second contrast signals to obtain said first contrast signal.

6. A method of displaying an image of a specimen from an optical microscope on a monitor, comprising the steps of:

stepping said microscope along a focusing direction of said microscope to sequentially move said microscope;

converting an image of said specimen from said microscope to a video signal by an opto-electric converting sensor;

obtaining a difference between an original video signal of said specimen taken by said sensor at each of a plurality of predetermined microscope stop positions in said stepping step and a delayed signal of said original video signal to generate a first contour-component signal of said specimen;

generating a first contrast signal representing a difference between maximum and minimum values of an amplitude of said first contour-component signal;

adjusting a focus of said image based on said first contrast signal; and displaying said image of said specimen in said in-focus state on said monitor.

7. A method according to claim 6, further comprising the step of detecting a maximum contrast signal from said first contrast signal so that the focus of said image is adjusted based on said maximum contrast signal.

8. A method according to claim 6, further comprising the step of picking up the image of said specimen again by said microscope when said microscope is set in said in-focus state and displaying said picked up image of said specimen.

9. A method according to claim 7, further comprising the step of comparing a first contrast signal generated at a present microscope stop position with a first contrast signal generated at a previous microscope stop position, and overwriting a video signal of said specimen stored in a memory with a video signal of said specimen at said present microscope stop position when said first contrast signal at the present microscope stop position is larger than said first contrast signal at a previous microscope stop position.

10. A method according to claim 6, wherein said step of obtaining the difference between said original and delayed signals is repeated a plurality of times for a predetermined contour component signal extraction area placed on said specimen at said each of said predetermined microscope stop positions of said stepping step to generate a plurality of second contour-component signals for each of said predetermined each microscope stop positions, and wherein said step of generating a first contrast signal includes the steps of generating a second contrast signal representing a difference between maximum and minimum values of an amplitude for each of said second contour-component signals, and summing said second contrast signals to produce said first contrast signal.

11. In a microscope apparatus wherein an image of a specimen from an optical microscope is converted to a video signal by an opto-electric converting sensor so that an image of said specimen in an in-focus state is displayed on a monitor, a method of detecting said in-focus state comprising the steps of:

stepping a microscope up/down moving mechanism to sequentially move said microscope along a focusing direction;

obtaining a difference between an original video signal of said specimen taken by said sensor at each of a plurality of predetermined microscope stop positions in said stepping step and a delayed signal of said original video signal to generate a first contour-component signal of said specimen;

generating a first contrast signal representing a difference between maximum and minimum values of an amplitude of said first contour-component signal;

detecting a maximum contrast signal from said first contrast signal; and fixing said microscope up/down moving mechanism at a microscope stop position where said maximum contrast signal is detected, to achieve said in-focus state.

12. In a microscope apparatus wherein an image of a specimen from an optical microscope in which an objective lens selected from among a plurality of objective lenses is used so that magnifying power of said microscope can be adjusted is converted to a video signal by an opto-electric converting sensor so that an image of said specimen in an in-focus state is displayed on a monitor, a method of setting said microscope in said in-focus state comprising the steps of:

stepping a microscope up/down moving mechanism to sequentially move said microscope along a focusing direction;

obtaining a difference between an original video signal of said specimen taken by said sensor at each of a plurality of predetermined microscope stop positions in said stepping step and a delayed signal of said original video signal to generate a first contour-component signal of said specimen;

generating a first contrast signal representing a difference between maximum and minimum values of an amplitude of said first contour-component signal;

detecting a maximum contrast signal from said first contrast signal at said predetermined microscope stop position; and fixing said microscope up/down moving mechanism at a microscope stop position where said maximum contrast signal is detected, to achieve said in-focus state, wherein delay time for said delayed signal of said original video signal is changed over in accordance with said selected objective lens.

13. A method according to claim 12, wherein said delay time is defined by:

$$t=(Ht*\alpha)/Hw$$

wherein t represents said delay time; Ht, horizontal scanning time of said opto-electric converting sensor; α, optical resolution of said microscope; and Hw, a horizontal field of view of said microscope.

14. In a microscope apparatus wherein an image of a specimen from an optical microscope is picked up and converted to a video signal by a television camera so that an image of the specimen in in-focus state is displayed on a display, a method of detecting the in-focus state comprising the steps of:

stepping said microscope along a focusing direction of said microscope to sequentially move said microscope;

obtaining a difference between an original video signal for each horizontal line taken by said television camera at each of a plurality of predetermined microscope stop positions in said stepping step and a delayed video signal for said horizontal line to generate a contour-component signal of said specimen;

detecting a difference between a maximum and minimum values of an amplitude of said contour-component signal to obtain a first contrast signal for each horizontal line;

summing said first contrast signal for each horizontal line to obtain a second contrast signal; and adjusting a focus of said image based on said second contrast signal.

15. A method according to claim 14, further comprising the step of detecting a maximum contrast signal from said second contrast signal so that the focus of said image is adjusted based on said maximum contrast signal.

16. A method according to claim 14, further comprising the step of setting an area on said specimen as a area to be subjected to the in-focus state detection.

17. An apparatus for detecting an in-focus state in a microscope apparatus including an optical microscope, comprising:

an opto-electric converting sensor for converting an image of a specimen from said microscope to a video signal;

a monitor for displaying said video signal;

a moving apparatus for stepping said microscope along a focusing direction of said microscope to sequentially move said microscope;

a contour-component signal extractor for obtaining a difference between said video signal of said specimen taken by said sensor at each of a plurality of predetermined microscope stop positions when said microscope is stepped and a delayed signal of said video signal to output said difference as a contour-component signal of said specimen;

a contrast signal detector for outputting a first contrast signal representing a difference between maximum and minimum values of an amplitude of said contour-component signal; and a controller coupled with said moving apparatus for adjusting a focus of said image based on said first contrast signal.

18. An apparatus according to claim 17, wherein said opto-electric converting sensor is a television camera.

19. An apparatus according to claim 17, wherein said controller detects a maximum contrast signal from said first contrast signal and adjusts a focus of said image of said specimen based on said maximum contrast signal.

20. An apparatus according to claim 17, wherein a delay time of said delayed signal of said original video signal is preset in accordance with the magnification depending on an objective lens of said microscope.

21. A method according to claim 20, wherein said delay time is defined by:

$$t=(Ht*\alpha)/Hw$$

wherein t represents said predetermined delay time; Ht, horizontal scanning time of said opto-electric converting sensor; α, optical resolution of said microscope; and Hw, a horizontal field of view of said microscope.

* * * * *